United States Patent [19]

Llewellyn

[11] Patent Number: 4,848,821
[45] Date of Patent: Jul. 18, 1989

[54] TAILGATE LADDER

[76] Inventor: Anthony S. Llewellyn, Rte. 4, Box 277, Athens, Ala. 35611

[21] Appl. No.: 208,508

[22] Filed: Jun. 20, 1988

[51] Int. Cl.$^4$ .............................................. B60R 3/02
[52] U.S. Cl. ...................................... 296/62; 280/166
[58] Field of Search ............. 296/62; 280/163, 164 R, 280/166

[56] References Cited

U.S. PATENT DOCUMENTS

| | | | |
|---|---|---|---|
| 3,515,406 | 6/1970 | Endsley, Jr. | 280/166 |
| 3,865,399 | 2/1975 | Way | 280/166 |
| 3,915,475 | 10/1975 | Casella et al. | 280/166 |
| 3,955,827 | 5/1976 | Wonigar | 280/166 |
| 4,021,071 | 5/1977 | Norman | 296/62 |
| 4,639,032 | 1/1987 | Barbour | 296/62 |

Primary Examiner—Dennis H. Pedder
Assistant Examiner—John M. Gruber
Attorney, Agent, or Firm—C. A. Phillips

[57] ABSTRACT

An unfolding ladder assembly for attachment to a tailgate is disclosed. The assembly includes a pair of plates for attachment to the outside of a tailgate, the plates providing surfaces against which edges of side frame members are biased in deployed position. Pivot pins are connected to the plates in spaced-apart relation, the pins engaging slots inside members of a step supporting frame. The frame is movable from a forward, deployed position where the pins engage rear portions of the slots, and the upper edges of said frame members, which form an obtuse angle with respect to the length of the frame, are biased upward against the plate surfaces. The step is projected rearward and downward from the tailgate by this means. A lower step frame supporting a second, lower step is pivotally attached to the lower end of the upper step frame. Notches in the side members of the lower step frame have surfaces that engage the upper step and hold the lower step in position. The assembly folds up against the outside of the tailgate for storage.

8 Claims, 2 Drawing Sheets

TAILGATE LADDER

FIELD OF THE INVENTION

This invention relates generally to vehicle accessories and more particularly to an unfolding ladder assembly for mounting on tailgates of pickup trucks.

BACKGROUND OF THE INVENTION

A need frequently arises for steps enabling a person to climb onto the bed of a pickup truck from the rear. Many pickup trucks have camper shells or other covers that form a barrier to access from the side. Some users, in particular, workmen who carry a load of tools, equipment, or supplies to a job site, may wish to climb on and off the bed many times during the course of a day, even if the bed is uncovered. The distance from a lowered tailgate to the ground is far enough to make climbing up or down inconvenient at best and dangerous when one's hands are occupied with carrying tools and the like.

Various types of unfolding step mechanisms for pickup truck tailgates have been disclosed previously. One approach, exemplified by U.S. Pat. Nos. 4,191,388 and 4,639,032, uses a U-shaped bar mounted on the inside of the tailgate, the bar being deployed by folding it downward over the outer edge of the tailgate. U.S. Pat. No. 3,961,809 discloses a step mechanism mounted on the outside of the tailgate, the steps moving downward for use by pivoting of linkage members around two horizontal shafts. The devices shown in these patents present a disadvantage in that they provide only one step between the ground and the tailgate, leaving a vertical distance substantially greater than for normal stair steps. A mechanism providing two steps is disclosed in U.S. Pat. No. 4,623,160, the steps being supported by a scissors-type system that folds up under the body of a recreational vehicle. Such mechanism, however, would not be practical for mounting on a tailgate. Another approach used for two-step ladders, as exemplified by U.S. Pat. No. 4,161,997, employs side frames that slide downward into contact with the ground for support. Such ladders fail to provide a firm footing where the surface of the ground is soft or irregular.

Desired features for a tailgate ladder assembly include simplicity of design and operation and a capability for providing more than one step. The assembly should also provide for easy movement of steps from stored to deployed position and back again. Once deployed, the steps should remain securely in position, with the steps spaced apart from one another and from the tailgate edge horizontally as well as vertically to facilitate climbing up and down them in the same manner as for a staircase.

SUMMARY OF THE INVENTION

The present invention is directed to a ladder assembly for attachment to a folding panel of a vehicle, such as a tailgate of a pickup truck or the like. The assembly includes plate means for attachment to the outside of a tailgate, forming a horizontal support platform when the tailgate is lowered and providing a pair of spaced-apart surfaces against which step frame upper edges interact. Coupling means enabling sliding and pivotal movement of a step support frame are also supported by the plate means. The step-supporting frame has side members with top edges thereof defining an obtuse angle with respect to frame sides. Upper regions of the side members include track means such as slots spaced apart from and generally parallel to the upper edges and engageable with the coupling means. The step-supporting frame is movable from a forward, deployed position to a rearward position that enables folding for storage. In deployed position, the frame is disposed forward so that the coupling means engages the rear of the slots and upper edges of side members engage the plate surfaces by virtue of being forced upward in pivoting of the frame member around the coupling means. The step-supporting lower end of the frame is projected diagonally downward and rearward owing to the obtuse angle of the upper edge of sides frames, thus providing horizontal as well as vertical spacing of the step away from the tailgate edge. For storage of the assembly, the step frame is movable by sliding to a rearward position wherein the upper edges of side members are not restrained against the plate surfaces, and the frame is free to rotate downwardly around the coupling means so that it may be folded against the outside of the tailgate when the tailgate is raised.

A second, lower step may be included by providing a lower step supporting frame pivotally attached to the lower end of the upper frame and having notches in its side members the include surfaces for engaging the top surface of the upper step. The lower frame is thereby restrained in diagonally downward and rearward extending positions. The lower step frame may be folded upward to a position inside the upper step frame for storage when the upper frame is disengaged.

Tailgate ladder assemblies embodying the invention exhibit simple and easily deployed step-supporting features which enable the upper step to be held securely in position once deployed. A lower step with its supporting structure may also be included, with the upper and lower steps being extended horizontally as well as vertically from one another and the tailgate in the manner of a normal staircase.

It is, therefore, an object of this invention to provide a tailgate ladder assembly that may be readily deployed from a folded storage position to an operative position.

Another object is to provide a tailgate ladder assembly having two steps.

Another object is to provide a two-step unfoldable tailgate ladder assembly wherein the steps in deployed position are spaced apart from one another horizontally as well as vertically.

Another object is to provide a tailgate ladder assembly supported solely by the vehicle and not by a frame member touching the ground.

Other objects and advantages of the invention will be apparent from the following detailed description and claims appended hereto.

DESCRIPTION OF THE PREFERRED EMBODIMENT

Figure 1:
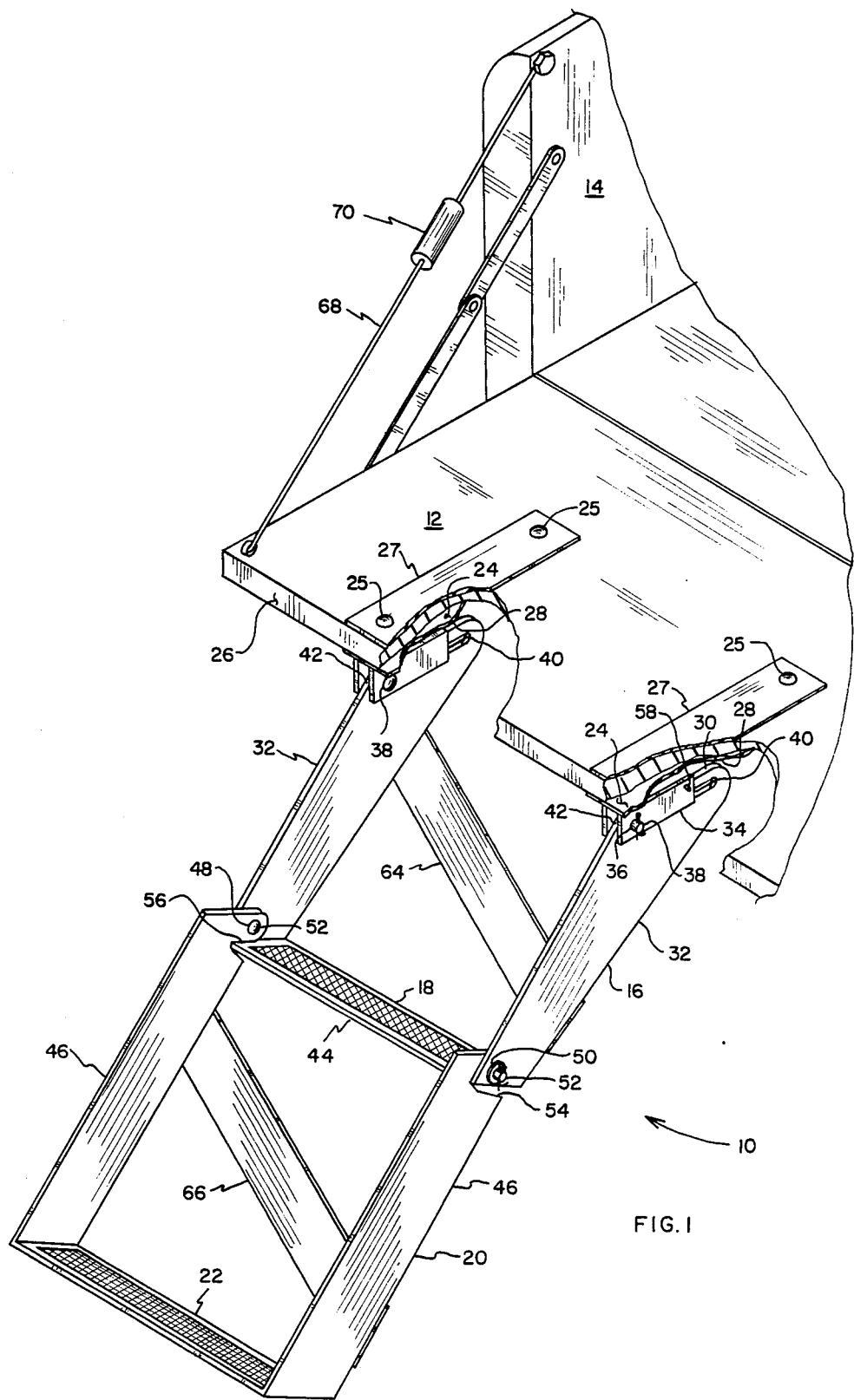
FIG. 1 is a pictorial view, partly broken away, showing in deployed position a tailgate ladder embodying the invention.

Referring to FIG. 1, there is shown an unfolding ladder 10 in deployed position extending downward from lowered tailgate 12 of a pickup truck 14. The ladder assembly includes an upper step frame 16 supporting upper step 18 and being connected to supporting means mounted on the outside of the tailgate and a lower step frame 20 supporting lower step 22 and being connected to the lower end of the upper step frame. The steps in deployed position are disposed generally parallel to one another and to the top surface of the lowered tailgate.

Figure 2:
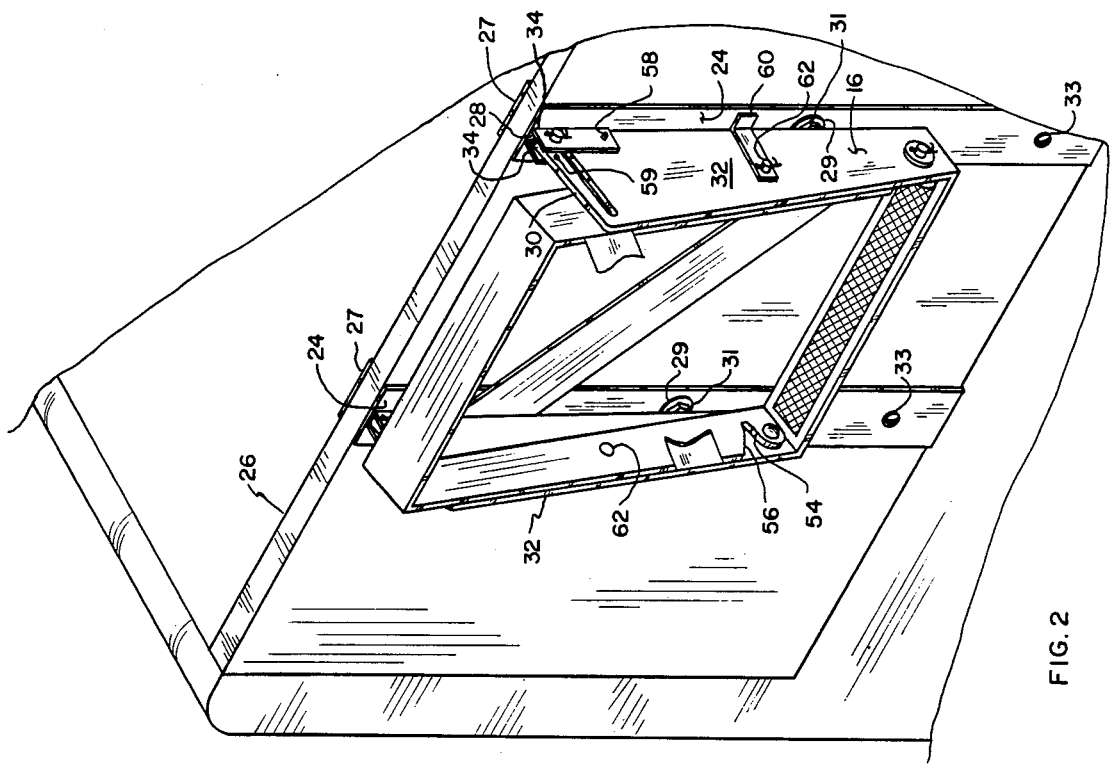
FIG. 2 is a pictorial view, partly broken away, showing the ladder of FIG. 1 in storage position on a raised tailgate.

As shown in FIG. 2 wherein the ladder is folded for storage with the tailgate in raised position, a pair of plates 24 are disposed on the outside of the tailgate extending downward from its upper edge 26 and transverse to its length. Plates 24 are rigidly secured to the tailgate by means of carriage bolt 25 (FIG. 1) extending through a second pair of plates 27 on the inside of the tailgate, forming with plates 24 a sandwich that encloses the tailgate. Carriage bolts 25 are engaged on the outside of plates 24 by washers 29 and nuts 31. Sheet metal screws 33 engaging the outer surface of the tailgate may be provided to further secure lower ends of plates 24 to the tailgate. For tailgates having irregular or curved surfaces, shims or fillers may be inserted between the plates and the tailgate as required to obtain the desired strength and orientation parallel to the inside of the tailgate.

Plates 24 provide surfaces 28 for engagement of upper edges 30 of side members 32 of upper step frame 16. Each of the plates has secured perpendicular thereto a pair of spaced-apart tabs 34 for receiving side members 32, the tabs being penetrated by holes 36 wherein a pair of pins 38 may be placed in axial alignment with one another, spaced part from and parallel to plates 24. The tabs extend forward from the holes, forming elongated tracks of rectangular cross section to facilitate guiding of upper frame edges therein during deployment and disengagement operations.

Side frame members 32 have elongated slots 40 spaced apart from and parallel to upper edges 30, the slots receiving pins 38 and enabling movement of the ladder from a deployed position to a storage position. In deployed position as shown in FIG. 1, the side frame members are located forward so that the pins engage the rear ends of the slots, the upper edges 30 are biased against surfaces 28 by the weight exerted by the lower part of the frame as it pivots downward around pins 38. In order for the step-supporting lower end of the frame to be projected horizontally as well as vertically away from the tailgate, upper edges 30 are disposed diagonally with respect to the length of side members 32. In particular, upper edges 30 form an obtuse angle with respect to a line from the top rear corners 42 thereof to the rear edge 44 of step 18. This angle may be conveniently in the range of 120 degrees to 135 degrees, with 127 degrees being preferred.

For disengagement of the ladder and folding up for storage, the frame may be slid to the rear until the forward ends of slots 40 come in contact with pins 38. Upon reaching this rearward position, upper edges 30 no longer are restrained by contact with surfaces 28, and the frame is free to rotate downwardly by pivoting action around pins 38. Step 18 is secured to the lower ends of side members 32 and aligned so that it will be in a plane generally parallel to the ground when deployed as well as parallel to upper edges 30 and to surfaces 28 on the tailgate.

Lower step frame 20 has side members 46 that support lower step 22 at their lower ends, the lower step being aligned in a plane generally parallel to the upper step. Side members 46 have holes 48 located near their upper front corners, these holes being aligned with matching holes 50 in the upper frame side member near the bottom thereof but above upper step 18. Pins 52 inserted through holes 48 and 50 secure the two frames together and provide for pivotal movement of the lower frame in deployment. Lower step frame 20 is made narrower than upper step frame 16 in order that side members 46 may fit inside of side members 32 and notch surfaces in side members 46 may engage upper step 18 when deployed. Side members have transversely extending notches 54 below holes 50, enabling lower frame 20 to be unfolded downward over upper step 18. The notches have defined therein edge surfaces 56 for engaging the upper surface of step 18, the edge surfaces in deployed position being generally parallel to upper edges 30 of side members 32. Lower frame 32 is restrained from further downward movement by this means, and lower step 22 is projected horizontally as well as vertically away from upper step 18. Thus, the two steps may be positioned with respect to one another and a lowered tailgate in a manner similar to the steps of a normal stairway.

In order to prevent the deployed upper step frame from prematurely moving backward, as might occur from shaking the tailgate when one is walking on it, spring-loaded detent 58 may be provided in the forward ends of outer tabs 34. The detents pass through the thickness of the tabs and are engageable with mating notches 59 (FIG. 2) in side members 32 between upper edges 30 and slots 40. The ladder may be secured in the storage position by providing L-shaped brackets 60 attached to plates 24 and spaced outside and adjacent the middle of the outer side of side members 32. The brackets have holes lined up with holes in the upper and lower side members, and pins 62 inserted hold the assembly in place. This feature enables the truck to be driven with the tailgate in lowered position. Spring-loaded detents may be provided in addition as a readily disengageable retaining means for driving with the tailgate in its normal, raised position.

The step frames may also be provided with braces 64, 66 as required to provide necessary stability. To assist the user in climbing, a cable 68 running from the outer edge of the tailgate to the top rear end of the pickup body may be installed and provided with a grippable handle 70.

Various changes and modification may be made to the embodiment described above without departing from the scope of the invention. For example, instead of providing two separate plates as described above, a single plate providing the two engageable surfaces and pin supporting tabs may be used. Also, the two pivot pins supporting the upper frame member may be replaced by a single shaft extending through both sets of tabs. It is to be understood that the invention is limited only as indicated by the following claims.

I claim:

1. A ladder assembly for a vehicle tailgate or the like comprising:
    plate means attachable to the outside face of said tailgate and providing a pair of co-planar, spaced-apart engageable surfaces disposed transverse to the length of the tailgate;
    pivotable coupling means supported by said plate means;
    a step frame including a pair of side members having a step secured therebetween at one end thereof, each of said side members being provided with an upper edge at an opposite end thereof, the upper edges forming an obtuse angle with respect to the length of said side members; and upper edge regions of said side members including track means slidably engaging said pivotable coupling means and enabling movement of said step frame from a, deployed position wherein said pivotable coupling means engages said track means at a rearward position thereof and said upper edges are restrained by said surfaces from upward movement with said track means being generally parallel with the tailgate when said step frame is in the deployed position, to a disengaged position wherein said upper edges are free from contact with said surfaces, and said frame is enabled to rotate downwardly around said pivotable coupling means;

whereby, when said step frame is in deployed position, the step supporting end thereof is projected diagonally downward and rearwardly from plane of said tailgate, and said step is securely disposed for being climbed.

2. A ladder assembly for attachment to a vehicle tailgate comprising:

plate means adapted to be secured to the outside face of a tailgate and providing a pair of co-planar, spaced-apart engageable surfaces transverse to the length of said tailgate;

shaft means supported by said plate means in spaced-apart relation therefrom and aligned axially parallel to a top edge of the tailgate;

a first upper step frame including a pair of side members having an upper step secured therebetween at their lower end;

side regions of said first upper step frame including an upper edge forming an obtuse angle with respect to a line from said top edge of said tailgate to a rearward edge of said upper step when in deployed position and a slot spaced apart from said upper edge and engaging said shaft means, said slot being generally parallel with the plane of the tailgate when said first upper step frame is in the deployed position, and said first upper step frame being movable from a, deployed position whereby said shaft means is engaged by a rearward portion of said slots, said upper edges of said side frame members are pivoted upward against said surfaces, and said first upper step frame is projected diagonally downward and rearward to a disengaged position whereby said shaft means is located at a forward position of said slots and the step-supporting end of said frame member is free to pivot downward and fold against said tailgate when in its raised position.

3. An assembly as defined in claim 2 including a second, lower step frame having a pair of side members and a lower step secured therebetween, said second step frame side members being pivotally secured to lower ends of said side members of said first upper step frame and having notches providing surfaces for engaging the upper surface of said upper step so as to restrain said lower step frame from downward movement when deployed.

4. An assembly as defined in claim 3 wherein said obtuse angle is from 120 degrees to 135 degrees.

5. An assembly as defined in claim 4 wherein said shaft means comprises a pair of coaxially disposed pins.

6. An assembly as defined in claim 5 wherein said step engaging surfaces of said lower step frame side members are disposed so as to be parallel to said upper edges of said first upper step frame members when in deployed position.

7. An assembly as defined in claim 6 including means for retaining said first upper step frame in its forward position when deployed.

8. An assembly as defined in claim 7 wherein said retaining means comprises a spring-loaded detent mounted on and penetrating said shaft-supporting means and engageable with a side member of said first upper step frame.

* * * * *